June 22, 1965     J. R. BONDI     3,190,029
FISHING DEVICE
Filed April 19, 1963
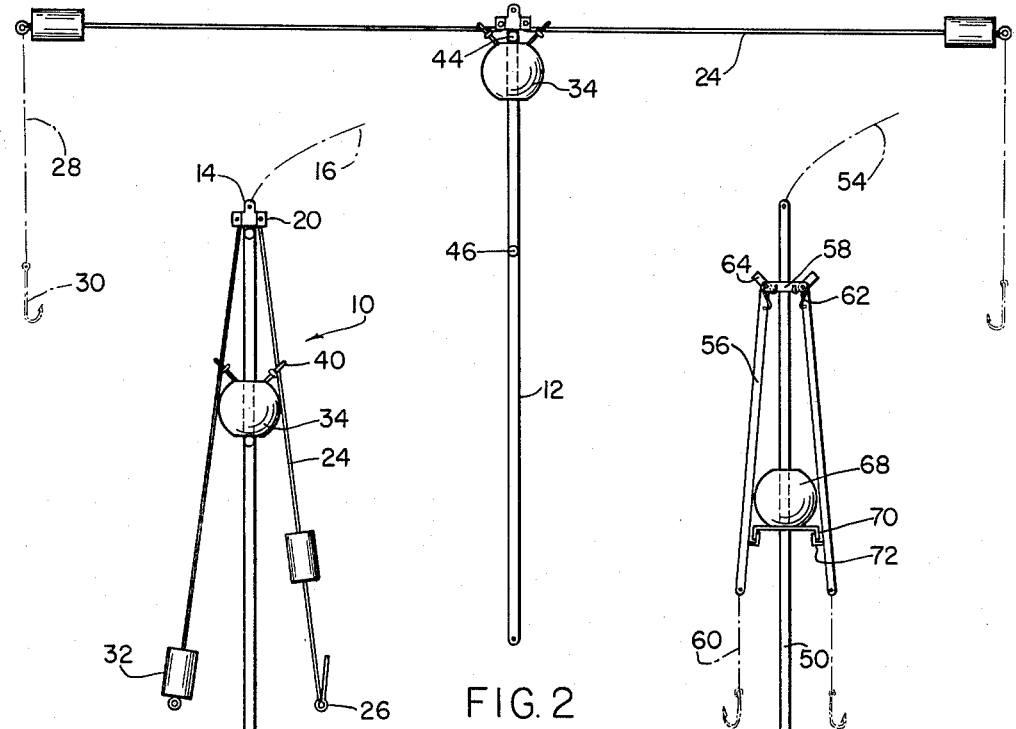
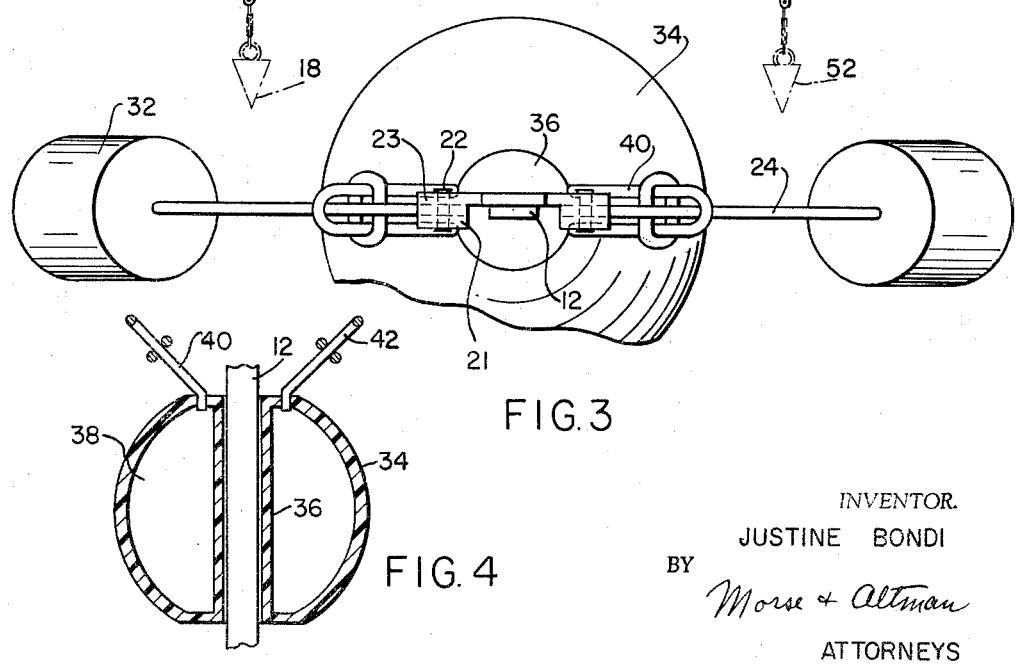
INVENTOR.
JUSTINE BONDI
BY
*Morse & Altman*
ATTORNEYS

3,190,029
FISHING DEVICE
Justine R. Bondi, 51 Newbury St., Revere, Mass.
Filed Apr. 19, 1963, Ser. No. 274,144
2 Claims. (Cl. 43—42.74)

This invention relates generally to fishing devices, and more particularly comprises a new and improved fish hook spreader having particular utility in fishing for bottom feeding fish.

When angling for bottom feeding fish such as sea bass, flounders, or the like, whether with a rod from the shore or with a hand line from a boat, there is a constant problem of keeping the baited hooks suspended high enough off the bottom as to be out of the reach of crabs and to prevent the hooks from catching on weeds and rocks. Normally, some sort of partially buoyant and weighted spreading device is employed to hold a number of hooks above the bottom. However, in using a device of this sort there is the annoyance of the spreading device becoming entangled in weeds, grass, rocks and the like, particularly when retrieving a line cast from the shore.

While a number of different spreading devices have been developed, all of them, by reason of their extended arms are subject to easy entanglement in weeds and rocks. In addition, such devices do not lend themselves to being easily cast, and, furthermore, a fish caught from a line dangling from one of the arms would pull angularly on the line and the device rather than in a substantially straight line as usually occurs. This condition makes it even more difficult to retrieve the rig and the fish through the weeds and rocks.

Accordingly, it is an object of the present invention to provide improvements in fishing devices of the sort employed for catching bottom feeding fish.

Another object of this invention is to provide means for automatically moving hook carrying arms from retracted to extended positions at a predetermined level above the bottom surface of the water.

Still another object of this invention is to provide a rig for use in fishing for bottom feeders where the hooks are adapted for automatic positioning at a predetermined height above the bottom surface when in operative position and further adapted for automatic retraction when being retrieved from the water.

More particularly, this invention features a fishing device comprising an elongated stem having a sinker attached to the lower end thereof and its upper end connected to a fishing line. Near the upper end of the stem are one or more elongated arms mounted for pivotal movement from a retracted position, in which the arms are disposed generally parallel to the length of the stem, to an extended position, in which they are disposed at substantially right angles to the stem. The outer ends of the arms are adapted to carry short lengths of line or leaders to which are attached hooks, lures or the like connected to the ends thereof. In a preferred embodiment of this invention each of the arms is provided with a buoyant member which serves to raise the arms from retracted to extended positions once the device is in the water.

This invention also features a guide float adapted to move up and down along the stem and is provided with arm engaging elements which serve to position the arms properly and to aid in raising them to their extended positions.

But these and other features of the invention, along with further objects and advantages thereof, will become more readily apparent from the following detailed description of the invention, with reference being made to the accompanying drawings, in which FIGURE 1 is a view in side elevation of a fishing device made according to the invention;

FIGURE 2 is a view similar to FIGURE 1 but showing the arms in extended position;

FIGURE 3 is a top plan view of the device;

FIGURE 4 is a fragmentary cross-section showing details in the construction of the guide float; and FIG. 5 is a view similar to FIGS. 1 and 2 but showing a modification of the invention.

Referring now to FIGURES 1–4 of the drawings, the reference character 10 generally indicates a fish hook spreading device having particular utility in casting for bottom-feeding fish. The device comprises an elongated center stem 12, perhaps a foot or so in length, and fabricated from a suitable material such as spring steel or the like. The stem 12 has an eye 14 formed at its upper end for attaching the device to the end of a line 16. At the lower end of the stem there is attached a lead sinker 18 which should be heavy enough to carry the device to the bottom of the water.

A cross piece 20 is secured near the upper end of the stem 12. Each end of the piece 20 is formed with a spaced fold portion 21 having an opening through which is passed a pin member 22 for engaging an eye 23 formed at the inner end of an extension arm 24. These arms may be ten inches or so in length and preferably are formed from a relatively rigid wire or the like. As shown, the outer ends of the arms are bent to form an eye 26 for attaching short leads 28 carrying baited hooks 30 or the like.

Near the outer end of each arm 24 there is mounted a tubular cork float 32 which assist in raising the arms 24 from the retracted positions shown in FIGURE 1 to the extended positions shown in FIGURE 2. It will be understood that normally the arms will lie generally against the stem 12 when hanging free in the air, as shown in FIGURE 1. However, once the device is in the water, the floats 32 will rise and the arms 24 will move to their extended positions, as shown in FIGURE 2.

By applying a moderate axial pressure on the floats 32, they may be pushed along the arms 24 to function as locking members for the bent end portions of the arms whereby the eyes 26 may be readily opened and closed to connect fresh leads 28.

Mounted for sliding movement along the stem 12 is a guide float 34, preferably of molded plastic construction and having a tubular sleeve 36 extending through the center thereof to form an annular watertight chamber 38 within the float. On the upper portion of the float 34 there is attached a pair of diverging guide members 40 each having an eye 42 formed on the outer end thereof and engaging an arm 24. Upper and lower stops 44 and 46 are formed on the stem 12 to limit the path of travel of the guide float 34.

In practice, the fish hook spreading device 10 is cast out into the water in the condition shown in FIGURE 1 with the arms in their retracted positions. It will be appreciated that casing is made easier and more accurate by concentrating the weight of the device along the centerline of the line 16. When the device drops into the water, the weight 18 will carry it to the bottom. At the same time the buoyancy of the guide float 34 in cooperation with the arm floats 32 will cause the arms 24 to extend into the operating position of FIGURE 2 and will hold the device in a generally upright position with the hooks 30 suspended above the bottom surface. When the device is retrieved, whether or not any fish has been caught, the arms 24 will retract into the FIGURE 1 position by the movement of the device through the water. Obviously this will facilitate the passage of the device through weeds, rocks and the like.

In FIGURE 5 there is shown a modification of the invention and in this embodiment a stem 50 has a weight 52 attached to its lower end with its upper end attached to a line 54. In this embodiment a pair of arms 56 are pivotally mounted to a cross piece 58 and carry a hook and leader 60 at either extremity. Each of the arms is biased for movement to extended positions by means of a spring 62 engaging each arm and the cross piece 58. Stop members 64 are provided integral with the arms 56 to limit the upward movement of the arms.

In order to hold the arms in normally retracted positions, a guide float 68 is slidably mounted along the stem 50 and is provided with a pair of depending fingers 70 adapted to interlock with latching members 72 formed on each of the arms 56. It will be understood that the latching arrangement will normally hold the arms in the retracted position shown in FIGURE 4. However, upon dropping into the water, the float 68 will move up the stem 50 to disengage the latching members 72 and permit the arms to bias outwardly under the force of the springs 62. It will be understood that the springs will be relatively weak so as to permit the arms to fold back into retracted positions when the device is being retrieved. As before, the guide float 68 will hold the device in a generally upright position while the weight is holding the device on the bottom.

It will be appreciated that the device described herein has particular utility for catching fish that feed near the bottom surface of the water in that the baited hooks may be suspended at a predetermined distance above the bottom so as to avoid catching crabs or the like while at the same time greatly improving the casting and retrieving of fish hook spreaders.

While the invention has been described with particular reference to the illustrated embodiment, it will be understood that numerous modifications thereto will appear to those skilled in the art. For example, additional arms may be provided on the device in order to carry additional leads and hooks. Other modifications will appear to those skilled in the art. It is therefore intended that the above description and accompanying drawings should be taken as illustrative of the invention and not in a limiting sense.

Having thus described the invention, what I claim and desire to obtain by Letters Patent of the United States is:

1. A fishing device for connection to the end of a fishing line, comprising an elongated support having an upper portion and a lower portion, a weight attached to the lower portion of said support, at least one elongated arm pivotally connected at one end to the upper portion of said support, float means mounted for free sliding movement along said support, guide means fixed to said float means and slidably engaging said arm, said guide means being adapted to hold said arm close to said support when said float means is at the lower portion of said support and to hold said arm generally perpendicularly to said support when said float means is at the top portion of said support, said float means being adapted to rise to the top portion of said support when said device is submerged in water to thereby hold said device in an upright position and to automatically bias said arm into a horizontally extending position, means for attaching fish catching devices to the free end of said arm, retrieval of said device being operative to cause said float means to slide to the bottom portion of said support and thereby retract said arm against said support.

2. A fishing device according to claim 1 including other float means mounted adjacent the free end of said arm.

References Cited by the Examiner

UNITED STATES PATENTS

| 1,312,824 | 8/19 | Boman. | |
| 1,464,387 | 8/23 | Kishpaugh | 43—35 |
| 2,157,003 | 5/39 | Mussina | 43—42.74 |
| 2,311,832 | 2/43 | Helfenstein | 43—36 |
| 2,683,324 | 7/54 | Engelman | 43—42.74 |

FOREIGN PATENTS

| 62,212 | 3/40 | Norway. |

ABRAHAM G. STONE, *Primary Examiner*.